United States Patent
Feliss et al.

(10) Patent No.: US 7,874,389 B2
(45) Date of Patent: Jan. 25, 2011

(54) FLEXIBLE HYBRID DRIVE SYSTEM FOR VEHICLE STABILITY CONTROL

(75) Inventors: Norbert A. Feliss, Sunnyvale, CA (US);
Karl A. Flechsig, Los Gatos, CA (US);
Donald R. Gillis, San Jose, CA (US);
Sylvia L. Lee, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1514 days.

(21) Appl. No.: 10/995,613

(22) Filed: Nov. 23, 2004

(65) Prior Publication Data
US 2006/0108161 A1    May 25, 2006

(51) Int. Cl.
*B60K 6/20* (2007.10)
*B60W 20/00* (2006.01)

(52) U.S. Cl. .............. 180/65.21; 180/65.265; 180/243

(58) Field of Classification Search .......... 180/233, 180/242, 243, 65.1, 65.2, 65.21, 65.22, 65.265
See application file for complete search history.

(56) References Cited

U.S. PATENT DOCUMENTS

| | | | |
|---|---|---|---|
| 937,859 A | 10/1909 | Pieper | |
| 3,608,661 A * | 9/1971 | Arnot | 477/21 |
| 4,090,577 A | 5/1978 | Moore | |
| 4,180,138 A | 12/1979 | Shea | |
| 4,351,405 A | 9/1982 | Fields et al. | |
| 5,238,077 A * | 8/1993 | Vaughn et al. | 180/415 |
| 5,249,637 A | 10/1993 | Heidl et al. | |
| 5,251,721 A * | 10/1993 | Ortenheim | 180/298 |
| 5,540,299 A * | 7/1996 | Tohda et al. | 180/243 |
| 5,908,077 A * | 6/1999 | Moore | 180/65.2 |
| 5,934,397 A | 8/1999 | Schaper | |
| 6,022,048 A * | 2/2000 | Harshbarger et al. | 280/781 |
| 6,205,379 B1 | 3/2001 | Morisawa et al. | |
| 6,453,228 B1 * | 9/2002 | Shimada | 701/89 |
| 6,578,649 B1 | 6/2003 | Shimasaki et al. | |
| 6,880,664 B2 * | 4/2005 | Pecnik et al. | 180/243 |
| 6,923,282 B2 * | 8/2005 | Chernoff et al. | 180/65.3 |
| 2001/0015299 A1 | 8/2001 | Moore | |

FOREIGN PATENT DOCUMENTS

| | | |
|---|---|---|
| DE | 4206360 | 9/1993 |
| JP | 49-6883 Y | 2/1974 |
| JP | 63-203428 | 8/1988 |
| JP | 63-141029 U | 9/1988 |
| JP | 5-008639 | 1/1993 |

* cited by examiner

*Primary Examiner*—J. Allen Shriver, II
*Assistant Examiner*—Jacob Meyer

(57) ABSTRACT

A hybrid drive system for integrated vehicle stability control. Specifically, the hybrid drive system includes a multi-wheeled vehicle, a drop-in electric drive motor, and a master controller. The multi-wheeled vehicle is originally configured for propulsion using an internal combustion engine. That is, the present invention is suitable for powering legacy vehicles. The internal combustion engine capable of driving at least one wheel of the multi-wheeled vehicle. The remaining wheels of the multi-wheeled vehicle are not driven by the internal combustion engine. The drop-in electric drive motor is adapted to independently drive at least one remaining wheel on the multi-wheeled vehicle. The master controller is coupled to the drop-in electric drive motor. The master controller controls speeds of the remaining wheels driven by the electric drive motor to provide propulsion and overall stability management for the multi-wheeled vehicle.

11 Claims, 3 Drawing Sheets

FLEXIBLE HYBRID DRIVE SYSTEM FOR VEHICLE STABILITY CONTROL

TECHNICAL FIELD

The various embodiments of the present invention relate to hybrid drive systems. More specifically, various embodiments of the present invention relate to flexible hybrid drive systems used for vehicle stability control.

BACKGROUND ART

The world transportation system is using natural resources at a high rate. That is, conventional drive systems using internal combustion engines rely on the use of natural resources, such as fossil fuels for power. However, the supply of fossil fuels is limited and world supplies are increasingly being stretched to support world demand. In addition, byproducts of these conventional drive systems cause unhealthy pollution. Moreover, the price of fossil fuels, such as gasoline, is increasingly becoming cost prohibitive. In the interest of saving natural resources, decreasing pollution, and saving costs, consumer demand for vehicles (e.g., automobiles) with increased fuel efficiency is becoming more prevalent.

A conventional solution is the hybrid vehicle in which internal combustion engines are tightly integrated with electric propulsion systems. Specifically, the conventional hybrid vehicle integrates two separate energy sources to power a single drive control system. Prior Art FIG. 1 illustrates a conventional hybrid vehicle 100 in which the internal combustion engine 110 and an electric drive system 120 is integrated in a drive control system. As shown in Prior Art FIG. 1, the conventional hybrid vehicle uses energy from either the internal combustion engine 110 or the electric drive system 120, separately or in combination, to drive a single set of wheels 130. However, the design engineering required to tightly integrate the internal combustion engine and the electric drive system is complex and could delay the introduction of new hybrid vehicles by a number of years. In addition, existing conventional hybrid drive vehicles having very tightly integrated internal combustion engine systems and electric drive systems have been very difficult to extend beyond a very few vehicle designs.

DISCLOSURE OF THE INVENTION

A hybrid drive system for integrated vehicle stability control. Specifically, the hybrid drive system includes a multi-wheeled vehicle, a drop-in electric drive motor, and a master controller. The multi-wheeled vehicle is originally configured for propulsion using an internal combustion engine. That is, the present invention is suitable for powering legacy vehicles. The internal combustion engine capable of driving at least one wheel of the multi-wheeled vehicle. The remaining wheels of the multi-wheeled vehicle are not driven by the internal combustion engine. The drop-in electric drive motor is adapted to independently drive at least one remaining wheel on the multi-wheeled vehicle. The master controller is coupled to the drop-in electric drive motor. The master controller controls speeds of the remaining wheels driven by the electric drive motor to provide propulsion and overall stability management for the multi-wheeled vehicle.

BRIEF DESCRIPTION OF THE DRAWINGS

The above and other objects and advantages of the present invention will be more readily appreciated from the following detailed description when read in conjunction with the accompanying drawings, wherein.

Prior Art

BEST MODES FOR CARRYING OUT THE INVENTION

Figure 1:
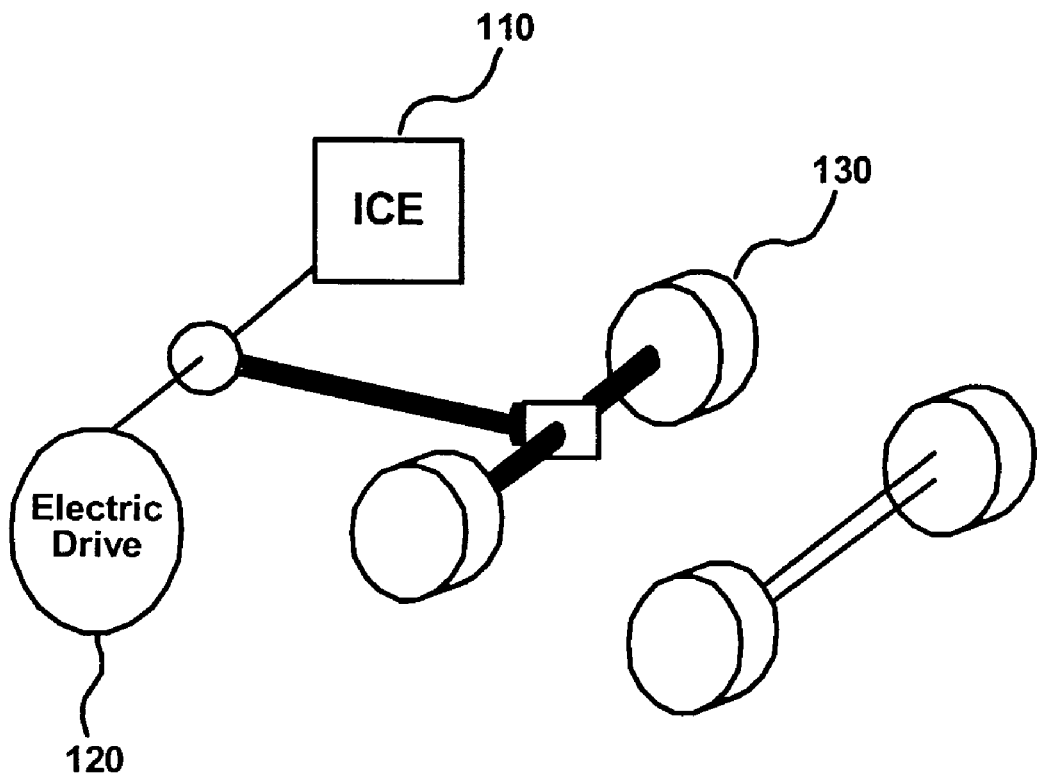
FIG. 1 is a diagram illustrating a conventional hybrid drive system.

Reference will now be made in detail to embodiments of the present invention, a flexible hybrid drive system for integrated vehicle stability management, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be any system implementable for controlling vehicle propulsion and stability management. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "calculating," or "applying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a flexible hybrid drive system for providing vehicle stability management. As a result, other embodiments of the present invention serve the above purpose and provides drop-in capabilities for electric propulsion that are adaptable for use with legacy vehicles which significantly reduces the time to market, and design engineering costs. In addition, other embodiments of the present invention serve the above purposes and further provides drive energy independent of petroleum imports, and further results in vehicle propulsion exhibiting reduced air pollution.

Figure 2:
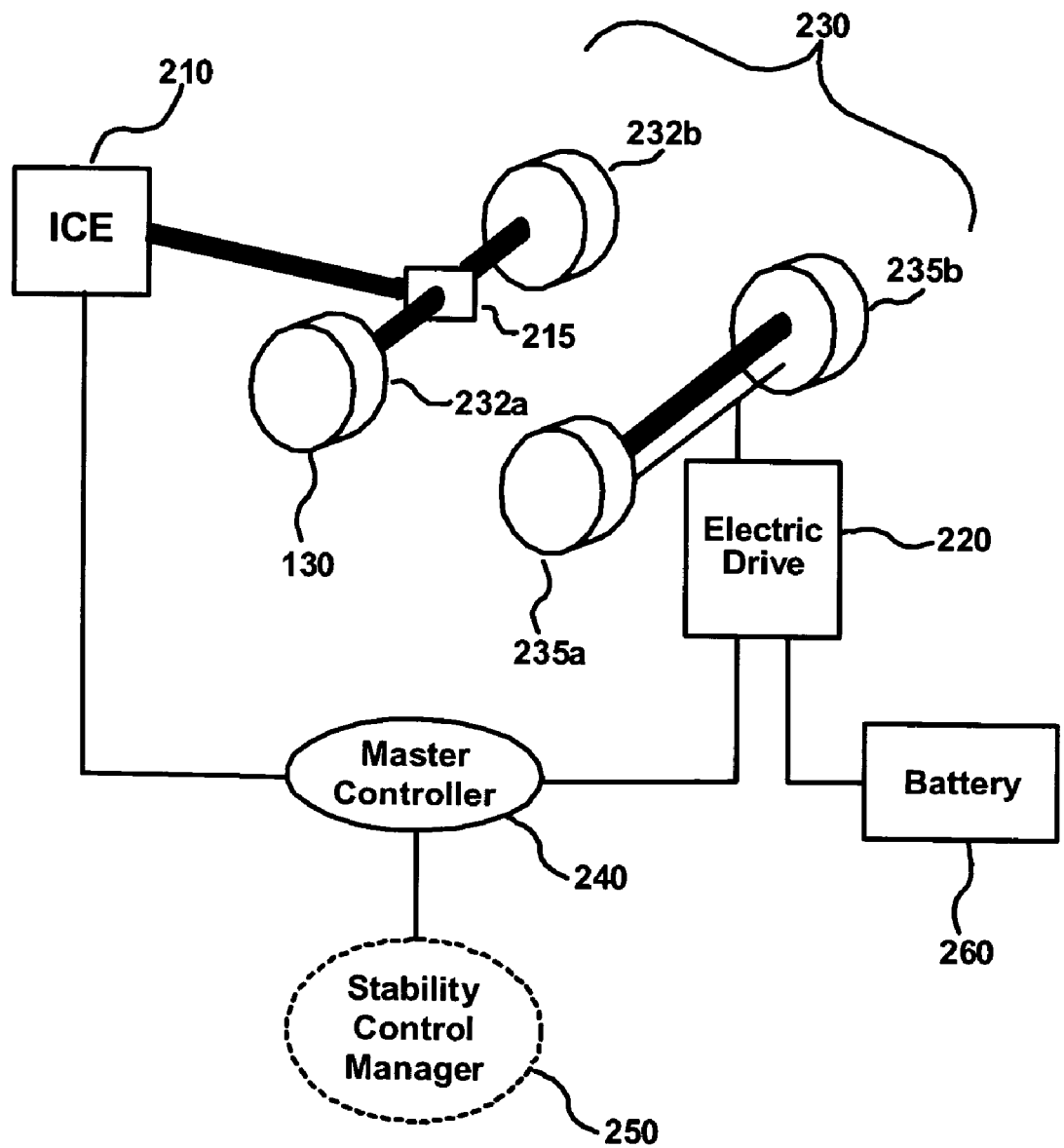
FIG. 2 is a diagram illustrating a drop-in hybrid drive system, in accordance with one embodiment of the present invention.

FIG. 2 is a diagram illustrating a hybrid drive system 200 for integrated stability control, in accordance with one embodiment of the present invention. The hybrid drive system 200 comprises an exemplary multi-wheeled vehicle 230, a drop-in electric drive motor 220 and a master controller 240. The hybrid drive system 200 includes an electrical drive system design that is fully operational independent of an existing drive system. Various advantages for the hybrid drive system 200 include an auxiliary source of power for accelerating the multi-wheeled vehicle 230, recovery of wasted braking energy, improved traction control, drive energy independent of petroleum imports, and reduced or no air pollution.

In FIG. 2, the multi-wheeled vehicle is originally configured for propulsion using an internal combustion engine 210. That is, the multi-wheeled vehicle is not originally configured as a hybrid drive vehicle. The internal combustion engine (ICE) 210 is capable of driving at least one wheel of the multi-wheeled vehicle. As shown in FIG. 2, the internal combustion engine 210 drives a set of wheels 232a and 232b through a box 215 (e.g., gear box). As such, the internal combustion engine 210 independently drives the wheels 232a and 232b to provide propulsion for the multi-wheeled vehicle 230.

As shown in FIG. 2, the exemplary multi-wheeled vehicle 230 comprises four wheels. Other embodiments of the present invention are well suited to provide a flexible drive system for a multi-wheeled vehicle that has less than or more than four wheels. For instance, the flexible drive system can be implemented on a two wheeled vehicle, a three wheeled vehicle, or a multi-wheeled vehicle including more than four wheels.

The multi-wheeled vehicle 230 comprises remaining wheels not driven by the internal combustion engine 210. These remaining wheels may be called coasting wheels, as they are not driven by the internal combustion engine 210. As shown in FIG. 2, the remaining wheels 235a and 235b are driven by an electric drive motor 220. For instance, the electric drive motor 220 drives a first remaining wheel 235a and a second remaining wheel 235b through a box (not shown), e.g., a gear box that is coupled to the wheels 235a and 235b. That is, the electric drive motor is adapted to independently drive at least one remaining wheel on the multi-wheeled vehicle 230 to provide propulsion and overall stability management for the multi-wheeled vehicle 230. The electric drive motor 220 can be dropped-in with any legacy vehicle. That is, the electric drive motor 220 is incorporated with legacy vehicles to drive the remaining wheels that are not conventionally driven by the internal combustion engine 210.

The hybrid drive system 200 includes a battery 260 that is coupled to the drop-in electric drive motor 220 for providing electrical energy to the drop-in electric motor 220. The battery 260 is scalable in size to match the power output of the internal combustion engine 210, and the designed power output of the multi-wheeled vehicle 230.

A master controller 240 is coupled to the drop-in electric drive motor 220 for controlling speeds of remaining wheels driven by the drop-in electric drive motor 220 to provide propulsion and overall stability management for the multi-wheeled vehicle 230. Specifically, the master controller is able to control the speeds of the wheels 235a and 235b in order to accelerate the wheels 235a and 235b or to decelerate the wheels 235a and 235b.

Additionally, the master controller 240 is able to independently control the speeds of each of the remaining wheels of the multi-wheeled vehicle that are driven by the electric drive motor 220. For instance, the master controller 240 can determine speeds for the wheels 235a and 235b in order to provide the proper propulsion or stability management for the multi-wheeled vehicle depending on the surface conditions encountered. Applied speeds for the wheels 235a and 235b may be different under some conditions.

As shown in FIG. 2, the stability control manager 250 is coupled to the master controller. In addition, the stability control manager 250 receives information that includes the operating speeds of each of the wheels in the multi-wheeled vehicle 230. The stability control manager 250 determines the proper speeds of each of the remaining wheels that are independently driven by the electric drive motor. For example, this speed determination is made according to the encountered driving conditions to provide the stability control management.

In one case, the stability control manager 250 determines that the speed of a remaining wheel needs to be increased or accelerated to compensate for unstable actions taken by the multi-wheeled vehicle to provide overall vehicle stability management. The stability control manager 250 is able to determine the proper speed for the remaining wheel in question and passes this information to the master controller 240. Thereafter, the master controller 240 directs the drop-in electric drive motor 220 to apply more power to the remaining wheel in question to provide the overall stability management.

In another case, the stability control manager 250 determines that the speed of a remaining wheel needs to be decreased or decelerated to compensate for unstable actions taken by the multi-wheeled vehicle to provide overall vehicle stability management. The stability control manager 250 is able to determine the proper speed for the remaining wheel in question and passes this information to the master controller 240. Thereafter, the master controller 240 directs the drop-in electric drive motor 220 to apply more conventional braking or regenerative, power braking to the remaining wheel in question to provide the overall stability management.

For example, the multi-wheeled vehicle 230 may have encountered icy road conditions, or may have been driven partly onto a shoulder. Certain of the wheels in the multi-wheeled vehicle may lose traction which is reflected in the speed of those wheels losing traction in relation to those wheels maintaining traction. At a high level, the stability control manager 250 is able to monitor the speeds of all the wheels in the multi-wheeled vehicle 230 to determine if some action is needed to correct for unstable actions taken by the multi-wheeled vehicle, such as starting a spin, losing traction on the shoulder, etc. Since both wheels on the same axle are able to move independently, the control manager 250 is able to apply differential power to one of the wheels that would allow the vehicle to move when one wheel is stuck. As such, the stability control manager 250 is able to determine the proper speeds to apply to respective remaining wheels in the multi-wheeled vehicle 230 in order to provide overall stability management. For instance, under icy conditions, when a remaining wheel loses traction, the stability control manager 250 may determine that it is proper to decrease the speed of that remaining wheel.

In another embodiment, the master controller 240 controls speeds of wheels driven by both the internal combustion engine 210 and the drop-in electric drive motor 220 to provide propulsion and overall stability management. For instance, the master controller 240 may accelerate the multi-wheeled vehicle using power from both the internal combustion engine 210 and the electric drive motor 220. Alternatively, the master controller 240 may decelerate through conventional braking or regenerative power braking of the wheels 232a and 232b independently or in combination to provide overall stability management of the multi-wheeled vehicle 230.

In one embodiment, the master controller 240 is able to provide power to the multi-wheeled vehicle 230 solely through the electric drive motor 220, as a stand-alone drive system. That is, the master controller 240 is able to selectively turn-off the internal combustion engine in preference to keeping on the drop-in electric drive motor 220. As such, the remaining wheels provide the propulsion for the multi-wheeled vehicle through the electric drive motor 220. In this case, the least amount of pollution from the internal combustion engine 210 is realized, since no power is being utilized from the internal combustion engine 210. For instance, this would be beneficial in stop/go traffic at a traffic light or on the city street/highway where grid-lock may be occurring and the internal combustion engine may be too inefficient to move the vehicle over small stop/start periods. Further, as a combination of power is being utilized from the internal combustion engine and the electric drive motor 220, varying degrees of air pollution being outputted by the internal combustion engine can be realized while still maintaining the same or satisfactory vehicle performance.

In another embodiment, the drop-in electric drive motor 220 is adapted to drive a first remaining wheel (e.g., 235a) and a second remaining wheel (e.g., 235b) in opposite rotating directions. The first remaining wheel and the second remaining wheel are located on the same axle, for instance the rear axle. This would provide a rotational movement to the rear of the vehicle that may be needed to free a car that is immovably parked in snow or ice conditions.

In still another embodiment, the drop-in electric drive motor 220 applies a "dithering" motion to a first wheel and a second wheel on the same axle. A "dithering" motion is a rapid back and forth motion that is of very high velocity. This motion may be necessary to free an immovable vehicle, such as one immovably parked in snow or ice conditions.

In another embodiment, the drop-in electric drive motor 220 in coordination with the master controller 240 applies a "venting" action to a first remaining wheel (e.g., 235a) rather than moving the wheel. The "venting" action can be applied to the brake assembly to cool down an excessively heated disk brake and pad assembly. For example, the "venting" action can be obtained from the drop-in electric motor 220 by allowing forced air to move through a conduit or pipe (not shown) rather than moving gears.

Figure 3:
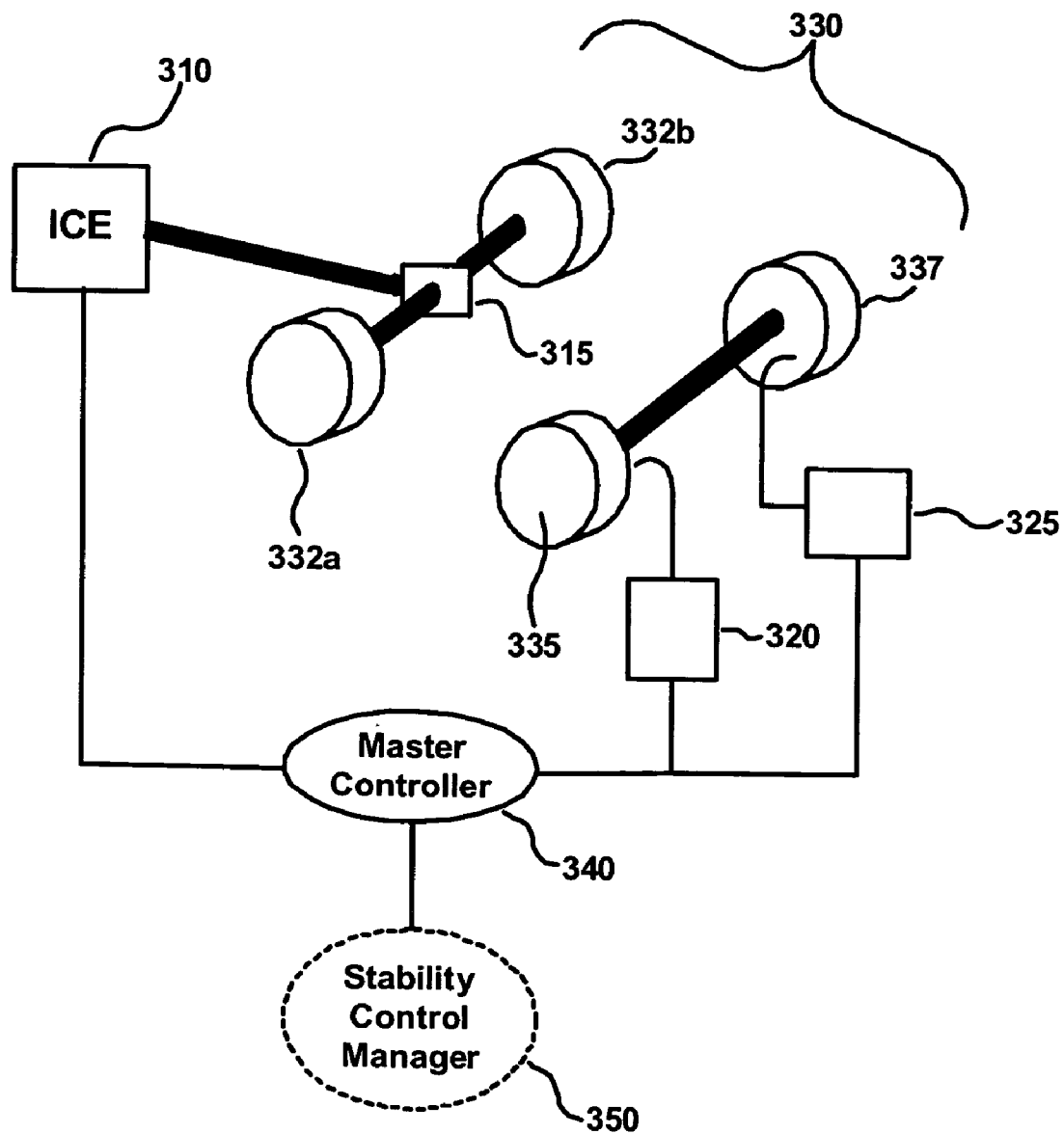
FIG. 3 is a block diagram illustrating a drop-in hybrid drive system, in accordance with one embodiment of the present invention.

FIG. 3 is a diagram of a hybrid drive system 300 for integrated stability control, in accordance with one embodiment of the present invention. The hybrid drive system 300 comprises an exemplary multi-wheeled vehicle 330, a plurality of drop-in electric drive motors (e.g., 320 and 325) and a master controller 340. The hybrid drive system 300 includes an electrical drive system design that is fully operational independent of an existing drive system. Various advantages for the hybrid drive system 300 include an auxiliary source of power for accelerating the multi-wheeled vehicle 330, recovery of wasted braking energy, improved traction control, drive energy independent of petroleum imports, and reduced or no air pollution.

In FIG. 3, the multi-wheeled vehicle 330 is originally configured for propulsion using an internal combustion engine (ICE) 310. That is, the multi-wheeled vehicle 300 is not originally configured as a hybrid drive vehicle. The internal combustion engine 310 is capable of driving at least one wheel of the multi-wheeled vehicle. As shown in FIG. 3, the internal combustion engine 310 drives a set of wheels 332a and 332b through a box 315 (e.g., gear box). As such, the internal combustion engine 310 independently drives the wheels 332a and 332b to provide propulsion for the multi-wheeled vehicle 330.

The multi-wheeled vehicle 330 comprises remaining wheels not driven by the internal combustion engine 310. For instance, as shown in FIG. 3, the remaining wheels 335a and 335b are driven by a plurality of electric drive motors (e.g., motors 325 and 320). Each of the plurality of drop-in electric drive motors is adapted to independently drive a respective remaining wheel on the multi-wheeled vehicle 330. For instance, the electric drive motor 320 drives a first remaining wheel 335 and the electric drive motor 325 drive a second remaining wheel 337. As such, the plurality of electric drive motors is adapted to provide propulsion and overall stability management for the multi-wheeled vehicle 330. The electric drive motors 320 and 325 can be dropped-in with any legacy vehicle. That is, the electric drive motors are incorporated with legacy vehicles to drive the remaining wheels that are not conventionally driven by the internal combustion engine 310. As in FIG. 2, the hybrid drive system 300 of FIG. 3 includes a battery (not shown) that is coupled to the plurality of drop-in electric drive motors for providing electrical energy.

A master controller 340 is coupled to each of the plurality of drop-in electric drive motors (e.g., 320 and 325) for controlling speeds of the remaining wheels driven by the plurality of drop-in electric drive motors to provide propulsion and overall stability management for the multi-wheeled vehicle 330. The functions of the master controller 340 are substantially identical to the functions of the master controller 240 of FIG. 2. Specifically, the master controller is able to independently control the speeds of the wheels 335 and 337 in order to accelerate the wheels 335 and 337 or to decelerate the wheels 335 and 337. For instance, the master controller 340 can determine speeds for the wheels 335 and 337 in order to provide the proper propulsion or stability management for the multi-wheeled vehicle depending on the surface conditions encountered and the actions taken by the multi-wheeled vehicle. Applied speeds for the wheels 335 and 337 may be different under some conditions.

As shown in FIG. 3, the stability control manager 350 is coupled to the master controller 340. The stability control manager 350 receives information that includes the operating speeds of each of the wheels in the multi-wheeled vehicle 330. The stability control manager 350 determines the proper speeds of each of the remaining wheels that are independently driven by the electric drive motors (e.g., 320 and 325). For example, this speed determination is made according to the encountered driving conditions to provide the stability control management. In one case, the stability control manager 350 determines that the speed of remaining wheel 337 needs to be increased or accelerated, or in another case, the stability control manager 350 determines that the speed of remaining wheel 337 needs to be decreased or decelerated, both to compensate for unstable actions taken by the multi-wheeled vehicle to provide overall vehicle stability management. This information is passed to the master controller 340. Thereafter, the master controller 340 directs the drop-in electric drive motor 325 to apply more power to the remaining wheel 337 or to apply degenerative braking power to the remaining wheel 337 to provide the overall stability management.

A method and system for processing concurrent events in a provisional network that comprises a plurality of dynamically allocatable nodes is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A hybrid drive system for integrated stability control, comprising:
    a multi-wheeled vehicle originally configured for propulsion using an internal combustion engine, said internal combustion engine capable of driving at least one wheel of said multi-wheeled vehicle, wherein said multi-wheeled vehicle comprises remaining wheels not driven by said internal combustion engine;
    a drop-in electric drive motor adapted to independently drive at least one remaining wheel on said multi-wheeled vehicle, wherein said drop-in electric drive motor is adapted to drive a first remaining wheel and a second remaining wheel on the same axle but in opposite rotating directions; and
    a master controller coupled to said drop-in electric drive motor for controlling speeds of remaining wheels driven by said drop-in electric drive motor to provide propulsion and overall stability management for said multi-wheeled vehicle.

2. The hybrid drive system of claim 1, wherein said drop-in electric drive motor is adapted to independently drive said first and second remaining wheel, wherein said master controller controls speeds of said first and second remaining wheels to provide said propulsion and said overall stability management.

3. The hybrid drive system of claim 1, further comprising:
    a battery coupled to said drop-in electric drive motor for providing electrical energy to said drop-in electric drive.

4. The hybrid drive system of claim 3, wherein said battery is scalable in size to match the power output of said internal combustion engine.

5. The hybrid drive system of claim 1, wherein said master controller directs said drop-in electric drive motor to apply more power to said first remaining wheel to provide said propulsion and said overall stability management.

6. The hybrid drive system of claim 1, wherein said master controller directs said drop-in electric drive motor to apply regenerative braking to said first remaining wheel to provide said overall stability management.

7. The hybrid drive system of claim 1, wherein said master controller controls speeds of wheels driven by said internal combustion engine and said drop-in electric drive motor to provide said overall stability management.

8. The hybrid drive system of claim 1, wherein said multi-wheeled vehicle comprises two wheels.

9. The hybrid drive system of claim 1, wherein said multi-wheeled vehicle comprises at least four wheels.

10. The hybrid drive system of claim 1, wherein said master controller selectively turns-off said internal combustion engine in preference to keeping on said drop-in electric drive motor.

11. The hybrid drive system of claim 9, further comprising:
    a stability control manager for determining proper speeds of said remaining wheels depending on encountered driving conditions to provide said stability control management.

* * * * *